United States Patent
Kurahashi et al.

[11] Patent Number: 6,164,367
[45] Date of Patent: Dec. 26, 2000

[54] AUTOMOTIVE AIR CONDITIONING APPARATUS

[75] Inventors: Yasufumi Kurahashi, Otsu; Minoru Fukumoto, Nara; Norio Yoshida, Moriyama, all of Japan

[73] Assignee: Matsushita Electric Industrial Co., Ltd., Kadoma, Japan

[21] Appl. No.: 08/947,035

[22] Filed: Oct. 8, 1997

[30] Foreign Application Priority Data

Oct. 9, 1996 [JP] Japan .................................. 8-268787

[51] Int. Cl.[7] .................................................. B60H 3/00
[52] U.S. Cl. ...................... 165/42; 237/2 B; 237/12.3 A; 237/12.3 B; 165/43
[58] Field of Search .................................. 165/41, 42, 43; 237/12.3 A, 2 B, 12.3 B; 62/238.6, 244

[56] References Cited

U.S. PATENT DOCUMENTS

| | | | |
|---|---|---|---|
| 5,291,941 | 3/1994 | Enomoto | 165/43 |
| 5,316,074 | 5/1994 | Isaji | 165/43 |
| 5,497,941 | 3/1996 | Numazawa | 165/43 |
| 5,501,267 | 3/1996 | Iritani | 165/43 |
| 5,626,186 | 5/1997 | Honda | 165/43 |
| 5,641,016 | 6/1997 | Asaji | 165/43 |
| 5,678,761 | 10/1997 | Ikeda | 237/12.3 A |
| 5,725,048 | 3/1998 | Burk | 165/43 |

*Primary Examiner*—Ira S. Lazarus
*Assistant Examiner*—Terrell McKinnon
*Attorney, Agent, or Firm*—Wenderoth, Lind & Ponack, L.L.P.

[57] ABSTRACT

An automotive air conditioning apparatus 10 is provided which includes a forced water supply system 9 and a heat pump system 14. A controller 16 controls the temperature of a second heat exchanger 38 of the heat pump system 14 to a desired temperature based on a preset temperature. The controller 16 also controls the temperature of the water circulating through the heat exchanger 20 of the forced water supply system 9 to a temperature at which the quantity of heat exchange between the air heated by the second heat exchanger 38 to the desired temperature and the heat exchanger 20 of the forced water supply system is minimized. According to this air conditioning arrangement, the temperature of the vehicle interior can be promptly raised without any capability drop being caused and thus, the heating efficiency of the apparatus being well enhanced.

18 Claims, 14 Drawing Sheets

AUTOMOTIVE AIR CONDITIONING APPARATUS

TECHNICAL FIELD OF THE INVENTION

The present invention relates to an air conditioning apparatus having a forced water supply system and a heat pump which can be advantageously employed in automotive vehicles, particularly electric motor vehicles.

BACKGROUND OF THE INVENTION

Generally, an automotive air conditioning apparatus includes an air conditioning duct which is open at one end in the interior of the vehicle and at the other end into atmospheric air. A heat exchanger is disposed in the duct, and a fan is provided for supplying air through the duct from the opening at one end into the vehicle interior. During a heating operation, a stream of air to be supplied from the one end opening into the vehicle interior is formed within the duct on the basis of the driving force applied to the fan, so that heat is imparted from the heat exchanger to the air, and the resulting high temperature air is utilized to heat the vehicle interior.

For use as a heating apparatus including the aforesaid heat exchanger wherein a heating medium is circulated through the heat exchanger, a heat pump system and a forced water supply system are known. In the heat pump system, the refrigerant is compressed by a motor-powered compressor so that heat is accumulated in the refrigerant. Next, the refrigerant is supplied to the heat exchanger disposed within the duct, to thereby heat the air flowing within the duct. Then, the refrigerant, after having been expanded by an expansion valve, is fed to the heat exchanger in which the refrigerant absorbs heat from the outside air. In the forced water supply system, water as a heating medium is first heated by a heater. In turn, the heated water is fed by means of a circulating pump to a heat exchanger disposed within the duct wherein the heated water heats the air flowing in the duct.

A known air conditioning apparatus includes a heat pump system and a forced water supply system so as to be able to supply heated air into the vehicle interior promptly upon starting of heating operation. In such an air conditioning apparatus, a heat exchanger of the heat pump system and a heat exchanger of the forced water supply system are disposed within the air conditioning duct so that the air fed in by means of a fan provided also in the air conditioning duct is heated by the two heat exchangers in the duct and supplied into the vehicle interior.

The quantity of air to be heated by the heat exchanger of the forced water supply system is usually adjusted by means of a mixing valve disposed in the duct. For example, in the air conditioning apparatus disclosed in Japanese Patent Laid-Open Publication No. 7-323717, the position of a mixing valve, or valve travel is adjusted according to the temperature preset by an operator so that the quantity of air to be heated in the forced water supply system can be controlled accordingly and so that the temperature of the water flowing in the heat exchanger of the forced water supply system is variable according to the preset temperature. Specifically, according to the teaching of the above cited disclosure, in proportion as the preset temperature is made higher, the travel of the mixing valve is increased so that a greater quantity of air is brought in contact with the heat exchanger of the forced water supply system and so that the temperature of the water is raised, whereby the temperature of the air supplied into the vehicle interior is promptly raised.

When the heat pump system is compared with the forced water supply system, generally it may be said that the heat pump system has higher heating efficiency but its heating capability under very low temperature conditions (e.g., −5° C.) is low. In contrast to this, the forced water supply system has no such high heating efficiency as the heat pump system, but involves no appreciable drop in its heating capability under very low temperature conditions. Therefore, an air conditioning apparatus equipped with the two systems can operate according to the ambient conditions (e.g., outdoor air temperature) in such a way that the heat pump system only is operated at one time, while at other times the heat pump system and the forced water supply system are operated in combination.

However, where the heat pump system and the forced water supply system are used in combination, it is necessary to control the temperature of the refrigerant flowing in the heat exchanger of the heat pump system and the temperature of the heating medium flowing in the heating exchanger of the forced water supply system. For example, assume that the heat exchanger of the heat pump system is disposed on the upstream side of the air flow in the duct, while the heat exchanger of the forced water supply system is disposed on the downstream side of the air flow, and that the temperature of the refrigerant in the heat exchanger of the heat pump system is 60° C. and the temperature of the heating medium in the heat exchanger of the forced water supply system is 40° C. In that case, the air heated at the heat exchanger of the heat pump would contact the heat exchanger of the forced water supply system, at a location downstream of the air flow, with the result that the heated air would be deprived of heat. As such, any sufficiently heated air could not be supplied into the vehicle interior, and this would result in wasteful power consumption.

Another problem is that where ambient conditions (temperature conditions) require operation of the heat pump system only, if the forced water supply system is stopped upon start of heating operation of the heat pump system, the air heated by the heat exchanger of the heat pump system contacts the heat exchanger of the forced water supply system which is held at a low temperature, so that the latter mentioned heat exchanger is deprived of its heat. Therefore, it takes time to raise the temperature of the air blowing out from a vent register.

A further problem is that if the first heat exchanger of the heat pump system frosts, the endothermic efficiency of the refrigerant is lowered.

Additionally, when the heat pump is started under severe ambient conditions, e.g., at a very low ambient temperature, a large load may be exerted upon the compressor. Under such conditions, therefore, the heat pump may be kept from being started in order to avoid such overloading; and this will result in a considerable drop in the heating capability of the air conditioning apparatus.

SUMMARY OF THE INVENTION

The object of the present invention is to provide an automotive air conditioning apparatus including a heat pump system and a forced water supply system which is capable of promptly elevating the temperature of the vehicle interior under very low ambient temperature conditions and can exhibit improved heating efficiency without any drop in its heating capability under low temperature conditions, and which can be advantageously employed in automotive vehicles, and more particularly in electric automobiles.

In order to accomplish this object, according to the invention there is provided an automotive air conditioning apparatus which has a duct connected at one end to the interior of the automotive vehicle and at the other end to the atmosphere such that the air sucked into the duct from the other end thereof is supplied into the vehicle interior through the one end. The air conditioning apparatus includes a heat pump system and a forced water supply system. The heat pump system includes a refrigerant, a first heat exchanger for causing the refrigerant to absorb heat from the outside air, and a second heat exchanger disposed within the duct which radiates the heat absorbed by the refrigerant to thereby heat the air within the duct. The forced water supply system includes water, a heater for heating the water, and a third heat exchanger disposed in the duct downstream of the second heat exchanger as viewed in the direction of air flow within the duct. The third heat exchanger being operative to further heat the air within the duct by using the heated water. The air conditioning apparatus further includes setting means for presetting the temperature of the air to be supplied into the vehicle interior through the duct, and control means for controlling the temperature of the second heat exchanger to a desired temperature computed on the basis of the temperature preset by the setting means and also for controlling the temperature of the water flowing in the third heat exchanger to a temperature at which the quantity of heat exchange between the air of the desired temperature and the third heat exchanger is minimized.

According to the arrangement of this air conditioning apparatus, the temperature of the water in the forced water supply system is controlled so that the quantity of heat exchange between the air of the desired temperature and the third heat exchanger is minimized. Therefore, the loss of heat at the third heat exchanger is minimized so that any wasteful power consumption during a heating operation can be restrained.

DETAILED DESCRIPTION OF THE PREFERRED EMBODIMENTS

Figure 1:
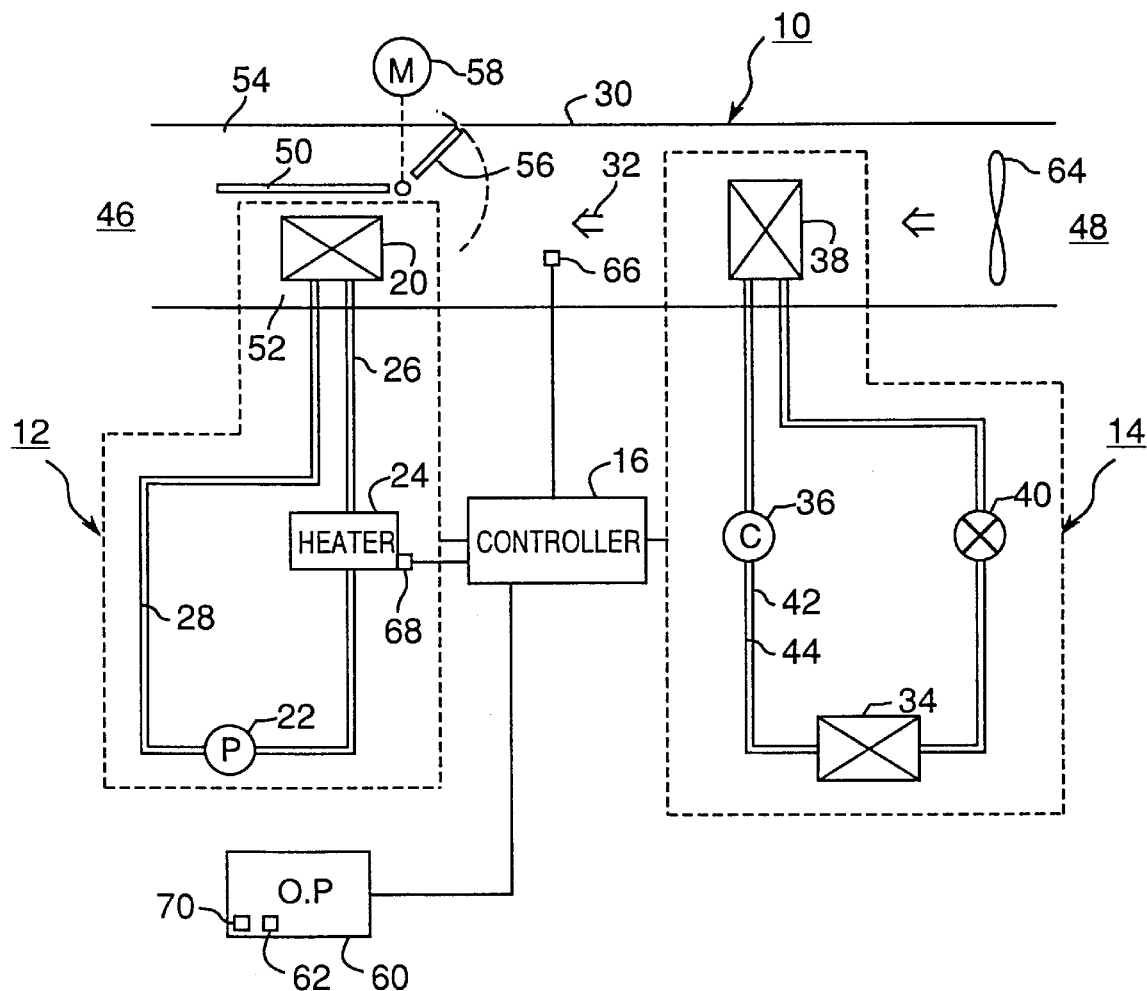
FIG. 1 is a block diagram showing a mechanical arrangement and an electrical arrangement in the air conditioning apparatus according to the present invention.

With reference to the accompanying drawings, a preferred embodiment of the automotive air conditioning apparatus of the present invention will now be described in detail. FIG. 1 is a block diagram showing both the mechanical arrangement and the electrical arrangement of the air conditioning apparatus. The air conditioning apparatus, shown generally by reference numeral 10, includes a forced water supply system (shown generally by reference numeral 12) for heating the vehicle interior utilizing the heat of heated medium, and a heat pump system (shown generally by reference numeral 14) for heating the vehicle interior utilizing the heat generated when the refrigerant is compressed, and a controller 16 for controlling these heating systems.

The forced water supply system 12 includes a heat exchanger (a third heat exchanger) 20, a pump 22, a heater 24, and a circulating pipe 26 which serially connects these devices in this order, with water 28 housed as a heating medium in the circulating pipe 26. The heat exchanger 20 is disposed within an air conditioning duct 30.

In the forced water supply system 12, water 28 is caused to circulate through the heat exchanger 20 and the heater 24 via the circulating pipe 26 in accordance with the actuation of the pump 22. In the course of circulation of the water 28, the water 28 is heated at the heater 24 and the heat of the water 28 thus heated is given at the heat exchanger 20 to the air 32 flowing in the air conditioning duct 30. The water 28 which has been deprived of heat is heated again at the heater 24. Although water is used as a heating medium in the present embodiment, heating mediums usable in the invention are not limited to water only, but include other heating mediums (such as engine cooling water or radiator water).

The heat pump system 14 includes a first heat exchanger 34, a compressor 36, a second heat exchanger 38, an expansion valve 40, and a circulating pipe 42 which serially connects these devices in this order, with a refrigerant 44 (e.g., HFC-134a) housed in the circulating pipe 42. The second heat exchanger 38 is disposed in the air conditioning duct 30, and the first heat exchanger 34 is disposed outside the duct.

In the heat pump system 14, the refrigerant 44 at the first heat exchanger 34 absorbs heat from the air. Then, the refrigerant 44 is compressed by the compressor 36 to a high temperature and, at the second heat exchanger 38, the compressed refrigerant imparts heat to the air 32 flowing in the air conditioning duct 30. In turn, the refrigerant 44 which has been deprived of heat is decompressed and expanded at the expansion valve 40 to a low temperature. Then, the cooled refrigerant 44 is sent to the first heat exchanger 34.

The duct 30 is connected at one end thereof to a vehicle interior 46 through a vent register not shown, while the other end of the duct 20 is open to the atmosphere 48. The heat exchanger 20 of the forced water supply system 12 is disposed closer to the vehicle interior 46 than the second heat exchanger 38 of the heat pump system 14. At one side of the third heat exchanger 20 there is disposed a partition wall 50 extending longitudinally of the duct 30 to define a first passageway 52 in which is housed the heat exchanger 20 and a second passageway 54 located opposite to the first passageway 52 with the partition wall 50 positioned therebetween. A mixing valve 56 made from a plate is pivotally mounted at one end of the partition wall 50 which is located on the upstream side of the flow of air 32.

The mixing valve 56 is drivingly connected to a motor 58 so as to be pivotable in response to the actuation of the motor 58, so that the mixing valve 56 can adjust the degree of opening of the first passageway 52 or second passageway 54 thereby to regulate the quantity of air coming in contact with the heat exchanger 20. The motor 58 is electrically connected to a temperature setting section 62 (e.g., slide lever type or digital type temperature setting device) provided on a heater control panel 60, so that the motor 58 can rotate according to the temperature preset by the temperature setting section 62 to change the position of the mixing valve 56 thereby to adjust the quantity of air to be heated by the heat exchanger 20. Specifically, when the preset temperature is raised, the degree of opening of the first passageway 52 becomes larger to permit an increase in the quantity of air heated by the heat exchanger 20, which results in a temperature rise in the air supplied into the vehicle interior 46. Conversely, when the preset temperature is lowered, the degree of opening of the first passageway 52 becomes smaller, thus resulting in a decrease in the quantity of air heated by the heat exchanger 20 which in turn lowers the temperature of the air supplied in the vehicle interior 46.

In the duct 30 there is also provided a fan 64 on the upstream side of the second heat exchanger 38 relative to the direction of flow of air 32 so that the air 32 in the atmosphere is introduced into the duct 30 through the rotation of the fan 64 and so that, after contacting the second heat exchanger 38, the air 32 flows into contact with the third heat exchanger 20 in the first passageway 52, and is then fed into the vehicle interior 46.

Generally, for the heat exchangers 20, 34, 38, heat exchangers of the parallel flow type, serpentine type, and the fin and tube type can be advantageously employed.

Connected to the controller 16 are a temperature sensor 66 for sensing the temperature of the air 32 flowing in the duct 30, and a temperature sensor 68 for sensing the temperature of the water flowing in the heater 24 of the forced water supply system 12. The controller 16 is also connected to the heater control panel 60, forced water supply system 12, and heat pump system 14, and controls the forced water supply system 12, heat pump system 14, and the position of the mixing valve 56 on the basis of the user preset values, i.e., control conditions input at the temperature setting section 62 of the heater control panel 60, and with reference to the detection data from the temperature sensors 66 and 68.

Figure 2:
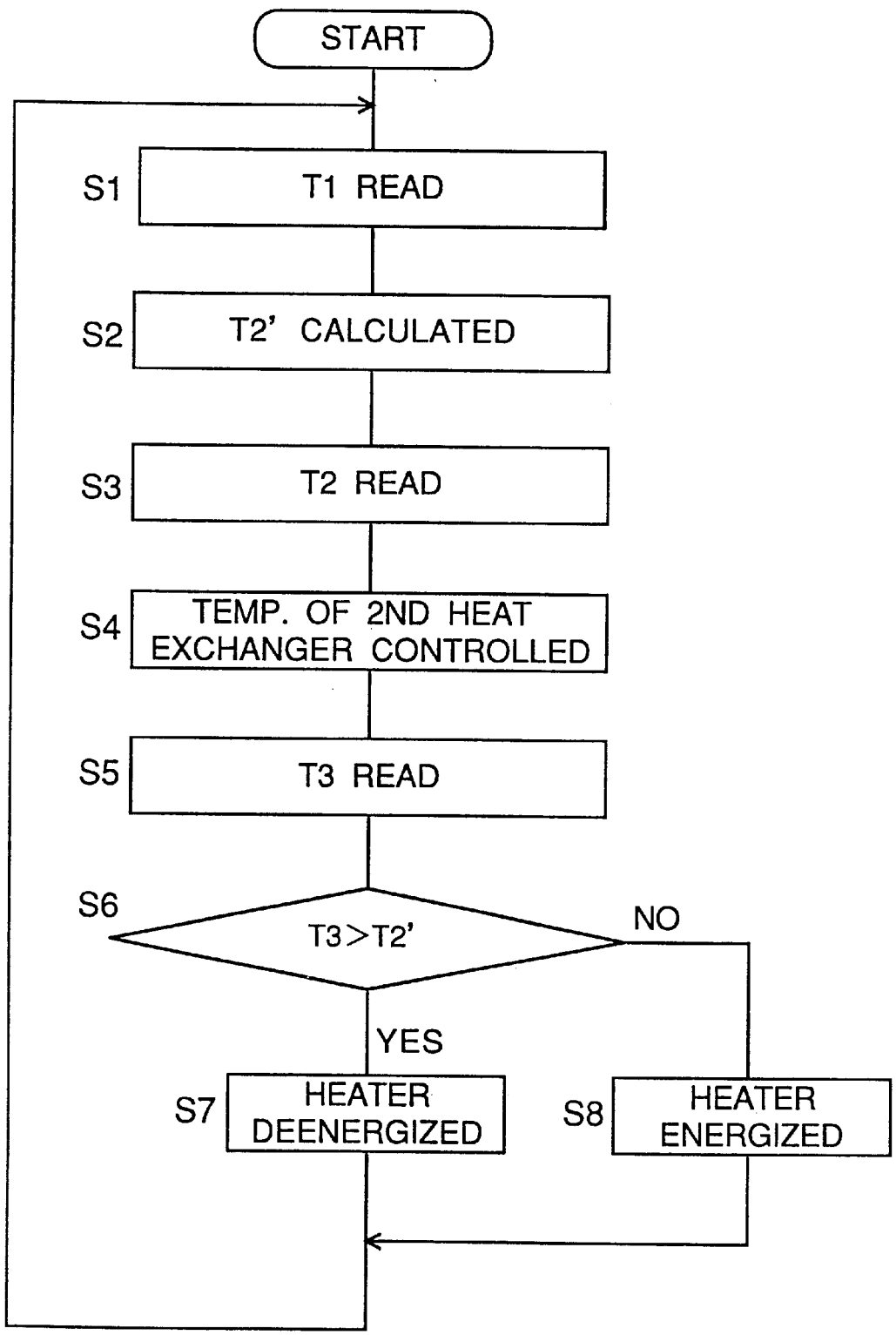
FIG. 2 is a flow chart showing a first mode of air conditioning control utilizing the air conditioning apparatus shown in FIG. 1.

FIG. 2 shows a flow chart of a control program incorporated into the controller 16. The control program is executed for each predetermined cycle time where a drive switch 70 (see FIG. 1) provided on the heater control panel 60 is at the ON position. Specifically, during a heating operation, the controller 16 reads temperature T1 preset at the temperature setting section 62 on the heater control panel 60 (S1) and calculates a desired temperature T2' of the heat exchanger 38 which corresponds to the preset temperature T1 (S2). Then, the controller 16 reads the temperature T2 of the air at a location downstream of the second heat exchanger 38 from a signal from the first temperature sensor 66 (S3). The controller 16 controls the operation of a compressor 36, i.e., the rotation speed of a motor (not shown) provided for the compressor 36, on the basis of the temperatures T2 and T2' to adjust the temperature T2 of the second heat exchanger 38 so that the temperature T2 of the air on the downstream side of the second heat exchanger 38 will agree with the desired temperature T2' of the second heat exchanger 38 (S4).

In connection with the above, it is to be noted that while in the heat pump system 14, in reality, the temperature of the second heat exchanger 38, the temperature of the air that has contacted the second heat exchanger 38, and the temperature of the air passing the location of the temperature sensor 66 may not necessarily coincide with one another, for the sake of brevity of explanation, it is assumed that in the present embodiment, and other embodiments to be described hereinafter, the above mentioned three temperatures would coincide with one another. Likewise, in the forced water supply system 12, in reality, the temperature of the water heated at the heater 24, the temperature of the water flowing in the heat exchanger 20, and the temperature of the heat exchanger 20 may not necessarily coincide with one another, but for brevity's sake it is assumed that the three temperatures would coincide with one another in the present embodiment and other embodiments to be described hereinafter.

Next, temperature T3 of the water heated by the heater 24 in the forced water supply system 12 is detected on the basis of a signal from the temperature sensor 68 (S5). Then, the detected water temperature T3 is compared with the desired temperature T2' of the second heat exchanger 38 in the heat pump system 14 (S6). If the result of the comparison indicates that the water temperature T3 is higher than the desired temperature T2', the heater 24 is switched off (S7), whereas if the water temperature T3 is lower than the desired temperature T2', the heater 24 is kept in operation (S8). Thereafter, the foregoing steps (S1 to S8) are repeated.

In this way, according to the arrangement of the air conditioning apparatus 10, temperature T3 of the water circulating through the heat exchanger 20 in the forced water supply system 12 is controlled so that it is equal to the temperature T2 of the second heat exchanger 38 of the heat pump system 14. Therefore, the air heated by the second heat exchanger 38 of the heat pump system 14 will not be deprived of heat by the heat exchanger 20 of the forced water supply system 12 when the air passes through the first passageway 39.

Figure 3A:
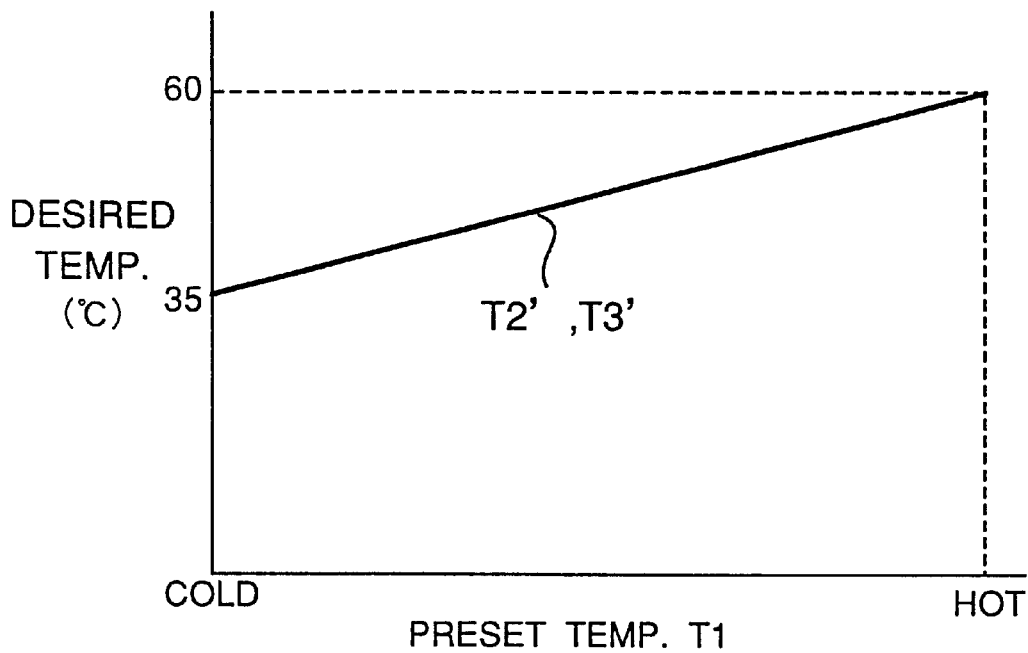
FIGS. 3(a) and 3(b) are graphs showing the relations between set temperature and desired temperature of the heat exchanger in the first mode of air conditioning control.
Figure 3B:
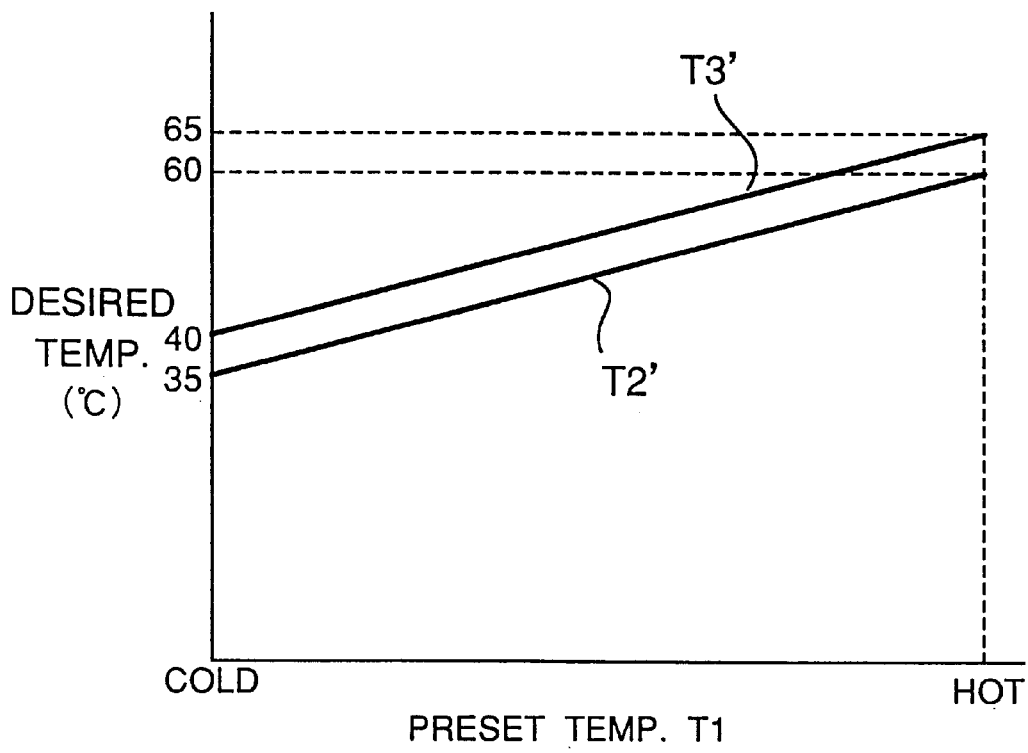

Although in the foregoing embodiment the water temperature T3 is so controlled as to agree with the desired temperature T2' of the second heat exchanger 38 (see FIG. 3 (a)), it is possible to control the water temperature T3 to, for example, a temperature equal to the desired temperature T2' of the second heat exchanger 38 plus a specified temperature, e.g., +5° C. (see FIG. 3 (b)). In this case, the temperature T3 of the heat exchanger 20 in the forced water supply system 12 is controlled to the desired temperature T2' of the heat pump system 14 plus a specified temperature (e.g., +5° C.) so that the air heated by the heat pump system 14 will not be deprived of heat at the heat exchanger 20 of the forced water supply system 12 when the heated air passes through the first passageway 52. Thus, the temperature supplied into the vehicle interior is promptly raised, and any wasteful heat loss and power consumption in the forced water supply system 12 can be restrained, resulting in improved heating efficiency.

Figure 4:
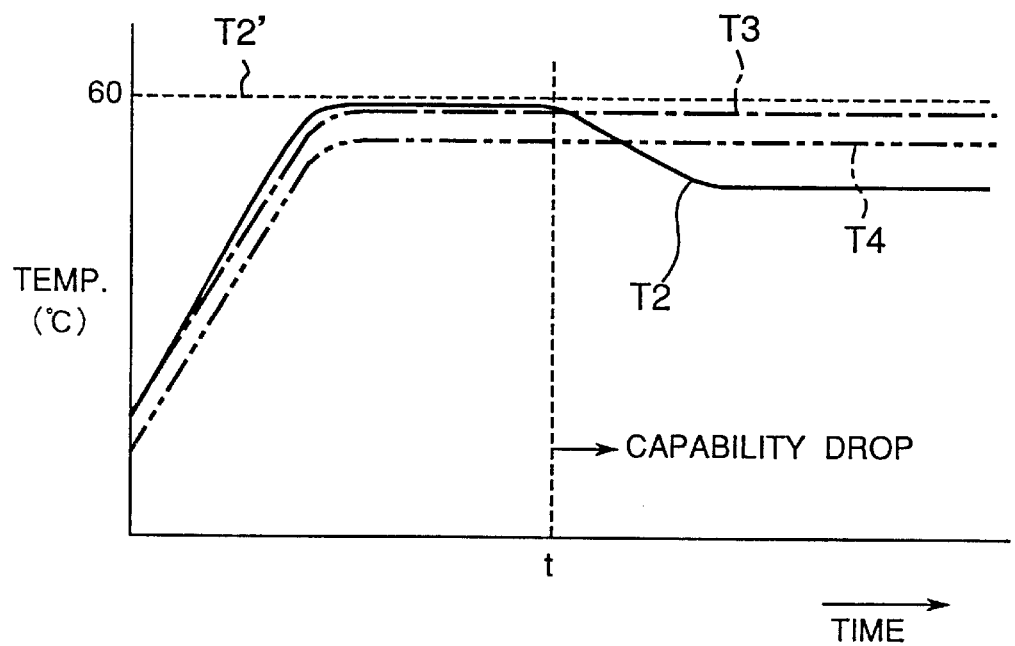
FIG. 4 is a graph showing changes with time in temperature of a second heat exchanger, heated water, and air blown into the vehicle interior in the first mode of air conditioning control.

FIG. 4 shows changes with time in temperature (especially changes with time during rise time) with respect to temperature T3 of the heat exchanger of the forced water supply system, temperature T2 of the second heat exchanger of the heat pump system, and temperature T4 blown from the vent register. As FIG. 4 shows, temperature T3 of the water flowing in the heat exchanger 20 of the forced water supply system is controlled at the same desired temperature as the temperature T2 of the second heat exchanger 38, and both T3 and T2 show a similar trend of temperature rise. As the capability of the heat pump system 14 is decreased due to frosting or the like after time t0, a temperature decrease will occur with the second heat exchanger 38. However, since the temperature of the forced water supply system 9 is controlled to the desired temperature, the temperature of the air blown from the vent register into the vehicle interior is maintained at a temperature level prior to such capability decrease.

Figure 5:
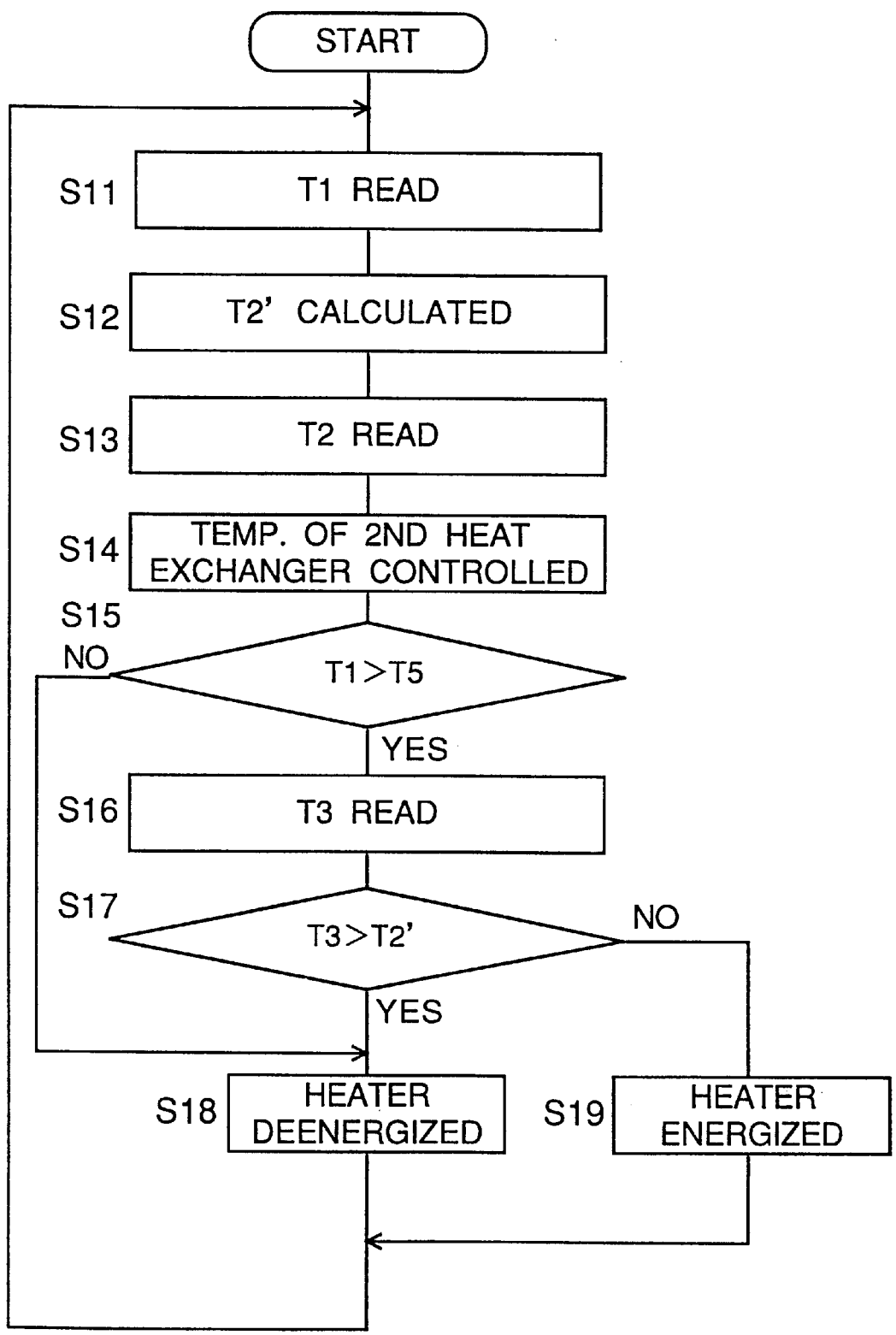
FIG. 5 is a flow chart showing a second mode of air conditioning control.

FIG. 5 is a flow chart showing a second mode of air conditioning control by the air conditioning apparatus 10. This mode of air conditioning control is carried out when the drive switch 70 of the heater control panel 60 is in ON condition. The controller 16 reads temperature T1 set at the temperature setting section 62 of the heater control panel 60 (S11), and calculates a desired temperature value T2' for the second heat exchanger 38 (S12). Next, the controller 16 detects temperature T2 of the air heated at the second heat exchanger 38 from a signal from the first temperature sensor 66 (S13). Then, the controller 16 controls the rotation speed of a motor (not shown) annexed to the compressor 25 with reference to the detected air temperature T2 thereby to control the second heat exchanger 38 so that the temperature T2 of the second heat exchanger 38 will coincide with the desired temperature T2' for the second heat exchanger 38 (S14).

Subsequently, decision is made whether the preset temperature T1 is higher than a specified temperature T5 or not (S15). In this case, the degree of opening of the first passageway 52 as adjusted by the mixing valve 35 is so small (e.g., about 50% or less) that the quantity of air passing through the first passageway 52 is reduced, and therefore the specified temperature T5 is a temperature at which no sufficient effect of heating by the heat exchanger 20 of the forced water supply system 12 could be obtained. When the preset temperature T1 is not more than the specified temperature T5, the heater 24 is deenergized (S18), and the controller 16 returns to step S11.

When the preset temperature T1 is higher than the specified temperature T5, the controller 16 reads temperature T3 of the water heated by the heater 24 on the basis of a signal from the second temperature sensor 68 (S16), and judges whether or not the temperature T3 of the heated water is higher than the desired temperature T2' for the second heat temperature 38 (S17). If the heated water temperature T3 is higher than the desired temperature T2', the heater 24 is deenergized (S18). If the heated water temperature T3 is not more than the desired temperature T2', the heater 24 is operated (S19). Thereafter, the foregoing steps are repeated.

In this way, in the present mode of air conditioning control, as is the case with the first mode of air conditioning control, the temperature of the water passing through the heat exchanger 20 of the forced water supply system 12 is so controlled as to be equal to the temperature of the second heat exchanger 38 so that the air heated at the second heat exchanger 38 will not be deprived of heat by the heat exchanger 20 of the forced water supply system when the heated air is passing through the first passageway 52.

Therefore, where the temperature preset at the heater control panel 60 is lower than the specified temperature, i.e., where the degree of opening of the mixing valve is so small that the quantity of air flowing into the first passageway 52 is limited, operation of the heat exchanger 20 of the forced water supply system is stopped and heating is carried out by heat pump system 14 alone. Thus, any wasteful power consumption and heat loss at the heat exchanger 20 of the forced water supply system can be prevented.

The temperature of water in the forced water supply system 12 may be controlled to the desired temperature of the second heat exchanger 38 in the heat pump system 14 plus a specified temperature (+5° C.).

Figure 6A:
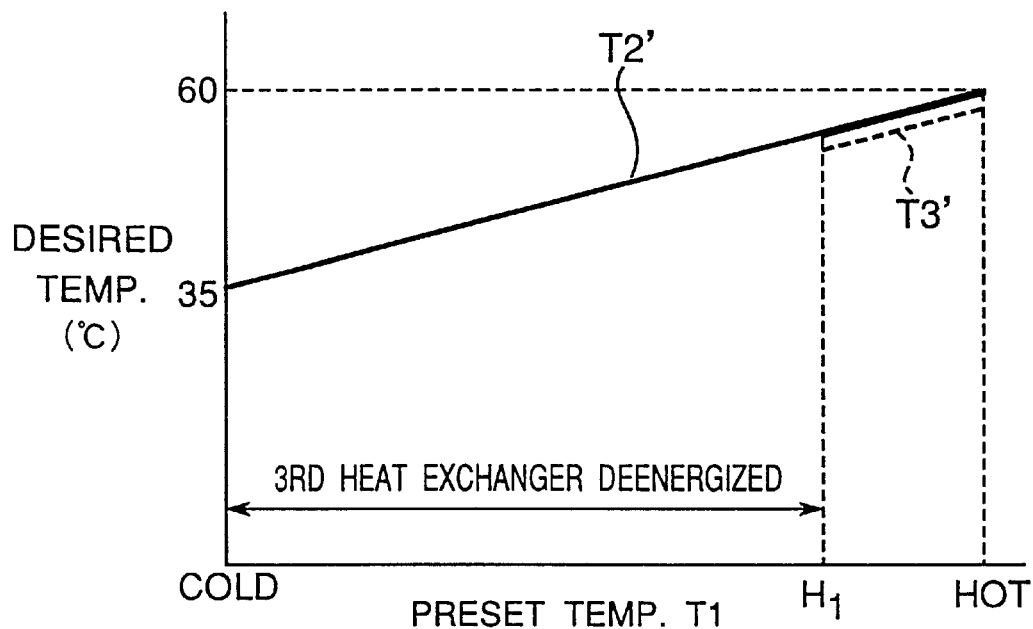
FIGS. 6(a) and 6(b) are graphs showing the relations between set temperature and desired temperature of the heat exchanger in the second mode of air conditioning control.
Figure 6B:
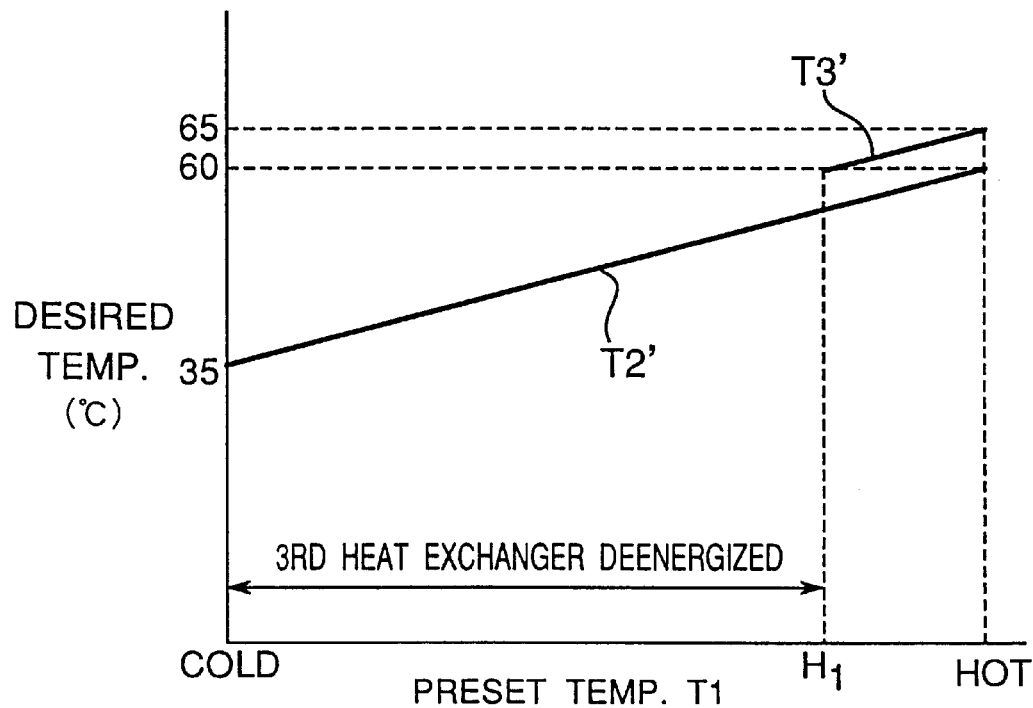

FIGS. 6 (a) and 6 (b) show the relations between the preset temperature (axis of abscissa) and respective desired temperatures (axis of ordinate) of the heat exchanger of the forced water supply system and of the second heat exchanger of the heat pump system in the above described second mode of air conditioning control. FIG. 6 (a) illustrates the case where the desired temperature T3' of the water flowing through the heat exchanger 20 of the forced water supply system is so controlled as to be equal to the desired temperature T2' of the second heat exchanger 38 of the heat pump system. In these figures, temperature H1 is a preset temperature in the case where the degree of opening of the mixing valve (the degree of opening of the first passageway) is 50%, i.e., a specified temperature which serves as a criterion for energize/deenergize determination with respect to the heat exchanger 20 of the forced water supply system. Where the preset temperature is lower than temperature H1, no temperature setting is made for desired temperature T3 of the water in the heat exchanger 20 of the forced water supply system. Where the preset temperature is higher than temperature H1, desired temperature T3' for the water in the heat exchanger 20 of the forced water supply system is set at the same value as the desired temperature T2' of the second heat exchanger 38. FIG. 6 (b) shows the case where the desired temperature T3' of the water in the heat exchanger 20 of the forced water supply system is set higher by a specified temperature value (+5° C.) than the desired temperature T2' of the second heat exchanger 38. In this case, if the preset temperature is lower than temperature H1, no setting is made with respect to desired temperature T3' for the water in the heat exchanger 20 of the forced water supply system, whereas if the preset temperature is higher than temperature H1, desired temperature T3' is set higher by a specified temperature value (5° C.) than the desired temperature T2' for the second heat exchanger 38.

Figure 7:
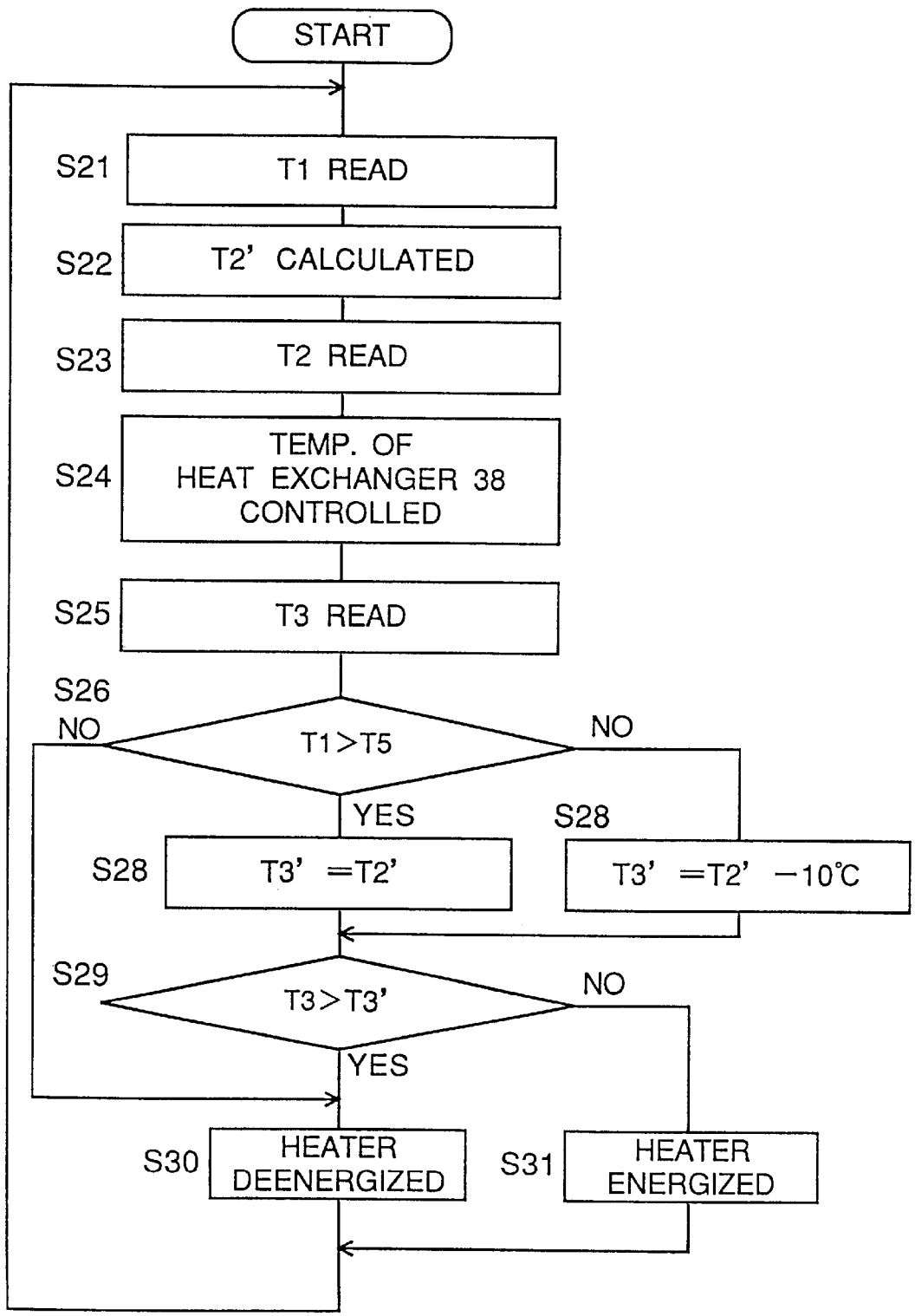
FIG. 7 is a flow chart showing a third mode of air conditioning control.

FIG. 7 is a flow chart showing a third mode of air conditioning control by the air conditioning apparatus wherein the air conditioning control is carried out when the drive switch 70 on the heater control panel 60 is in the ON condition. The controller 16 reads temperature T1 preset at the temperature setting section 62 of the heater control panel 60 (S21) and calculates a desired temperature T2' for the second heat exchanger 38 (S22). Then, the controller 16 detects temperature T2 of the air heated at the second heat exchanger 38 on the basis of a signal from the first temperature sensor 66 (S23). Subsequently, the controller 16 controls the rotation speed of a motor (not shown) annexed to the compressor 25 on the basis of the detected air temperature thereby to control the second heat exchanger 38 so that temperature T2 of the second heat exchanger 38 can agree with the desired temperature T2' for the second heat exchanger 38 (S24).

Next, temperature T3 of the water flowing thorough the heater 24 is detected by the second temperature sensor 68 (S25). Thereafter, a determination is made as to whether or not preset temperature T1 is higher than a specified temperature T5 (S26). As earlier mentioned, the specified temperature T5 in this case is a temperature at which the degree of opening of the mixing valve 56 (degree of opening of the first passageway 52) is so small that any sufficient effect of heating at the heater 24 cannot be obtained. When the preset temperature T1 is higher than the specified temperature T5, a desired water temperature T3' is so set as to be equal to the desired temperature T2' for the second heat exchanger 38 (S27). When the preset temperature T1 is lower than the specified temperature T5, the desired water temperature T3' is set 10° C. lower than the desired temperature T2' of the second heat exchanger 38 (S28). Thereafter, it is determined whether or not the water temperature T3 is higher than the desired water temperature T3' (S29). If the water temperature T3 is higher than the desired water temperature T3', the heater 24 is deenergized (S30), and if the water temperature T3 is lower than the desired water temperature T3', the heater 24 is operated (S31). Thereafter, the foregoing steps are repeated.

Figure 8:
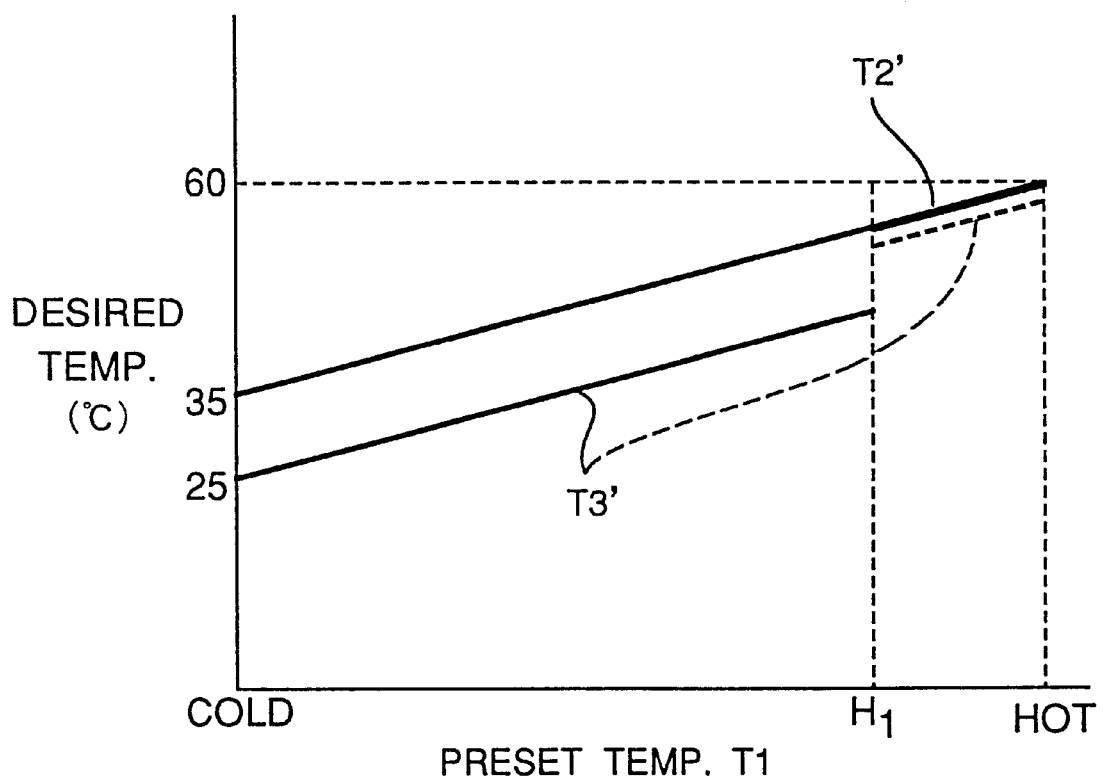
FIG. 8 is a graph showing the relations between set temperature and desired temperature of the heat exchanger in the third mode of air conditioning control.

FIG. 8 shows the relations between the preset temperature (axis of abscissa) and respective desired temperatures (axis of ordinate) of the heat exchanger of the forced water supply system and of the second heat exchanger of the heat pump system in the above described third mode of air conditioning control. As FIG. 8 shows, when the preset temperature T1 on the heater control panel 60 is lower than the specified temperature H1, the desired water temperature T3' at the heat exchanger 20 of the forced water supply system is set 10° C. lower than the desired temperature T2' of the second heat exchanger 38. When the preset temperature T1 is higher than the specified temperature H1, the desired water temperature T3' is set to the same temperature value as the desired temperature T2' of the second heat exchanger 38. In this way, where the preset temperature is lower than the specified temperature value, the desired water temperature T3' is set lower, and this prevents any wasteful water heating at the heat exchanger 20 of the forced water supply system which is inherently of low heating efficiency, wasteful power consumption being thus restrained.

Figure 9:
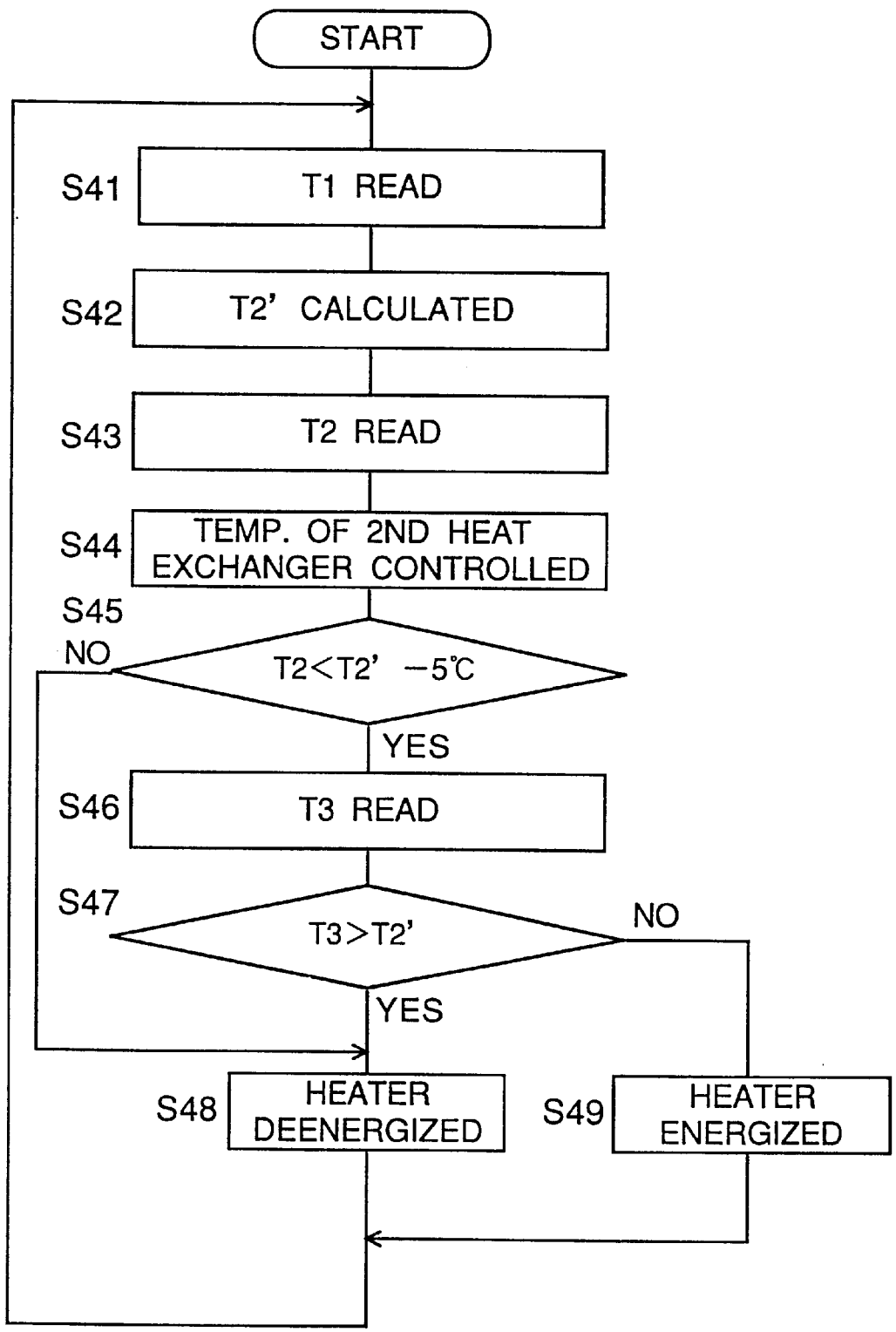
FIG. 9 is a flow chart showing a fourth mode of air conditioning control.

FIG. 9 is a flow chart showing a fourth mode of air conditioning control by the air conditioning apparatus. This mode of air conditioning control is carried out when the drive switch 70 of the heater control panel 60 is in the ON condition. The controller 16 reads temperature T1 set at the temperature setting section 62 of the heater control panel 60 (S41), and calculates a desired temperature value T2' for the second heat exchanger 38 (S42). Next, the controller 16 detects temperature T2 of the air heated at the second heat exchanger 38 from a signal from the first temperature sensor 66 (S43). Then, the controller 16 controls the rotation speed of a motor (not shown) annexed to the compressor 25 with reference to the detected air temperature T2 thereby to control the second heat exchanger 38 so that the temperature T2 of the second heat exchanger 38 will coincide with the desired temperature T2' for the second heat exchanger 38 (S44).

Next, in accordance with a signal from the first temperature sensor 66, the controller 16 judges whether or not the temperature T2 of the air flowing adjacent the location of the first temperature sensor 66 is lower than a specified temperature (i.e., the desired temperature T2' of the second heat exchanger 38 minus 5° C.) (S45). If the air temperature T2 is higher than a specified temperature, the heater 24 is deenergized (S48), and the program returns to the initial step (S41). If the air temperature T2 is higher than the specified temperature, the program proceeds to step S48. If, at step S45, the air temperature T2 is judged to be lower than the specified temperature, the second temperature sensor 68 detects the temperature T3 of the water heated by the heater 24 (S46), and a determination is made whether or not the temperature T3 of the heated water is higher than the desired temperature T2' of the second heat exchanger 38 (S47). If the temperature T3 of the heated water is higher than the desired temperature T2' of the second heat exchanger 38, the heater 24 is deenergized (S48). If the temperature T3 of the heated water is lower than the desired temperature T2' of the second heat exchanger 38, the heater 24 is operated (S49). Subsequently, the foregoing steps are repeated.

Figure 10:
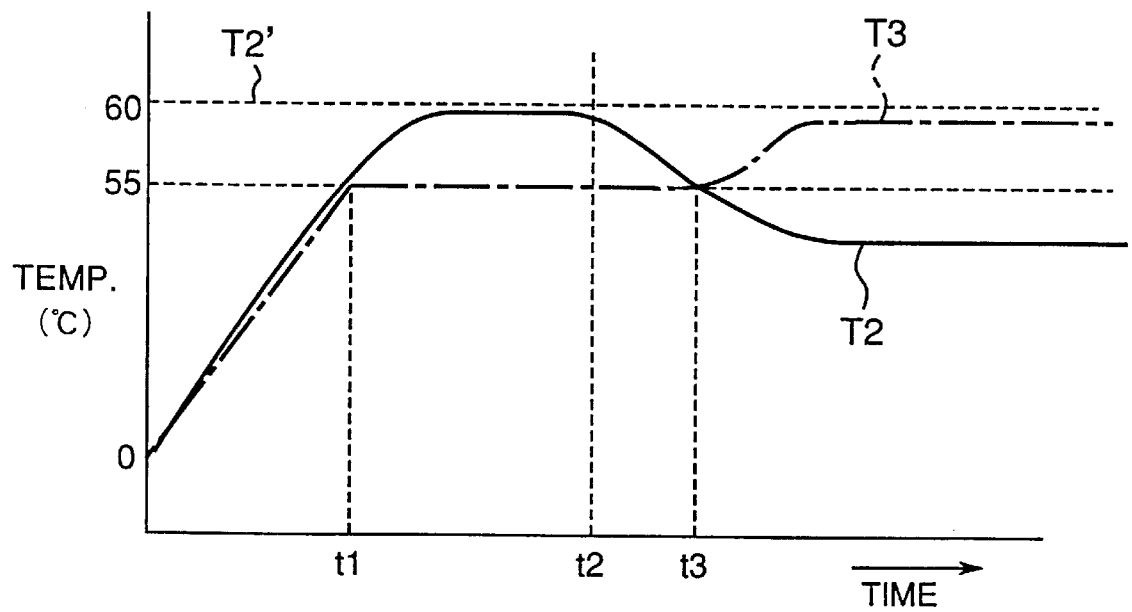
FIG. 10 is a graph showing the relations between set temperature and desired temperature of the heat exchanger in the fourth mode of air conditioning control.

According to this mode of air conditioning control, when the temperature of the second heat exchanger 38 is lowered more than a specified degree from the desired temperature, the temperature of the water in the heat exchanger 20 of the forced water supply system is controlled to the desired temperature of the second heat exchanger 38. FIG. 10 shows changes with time of the temperature of the water in the heat exchanger 20 of the forced water supply system and the temperature of the air at a location downstream of the second heat exchanger 38 (location of the temperature sensor 66). In FIG. 10, the desired temperature T2' of the second heat exchanger 38 is set at 60° C. After the start of the air conditioning apparatus and until time t1, temperature T3 of the water flowing in the second heat exchanger 38 and that of the water flowing in the heat exchanger 20 of the forced water supply system rise toward respective desired temperatures. If, at time t1, water temperature T3 drops to a temperature 5° C. lower than the desired temperature T2' (55° C.), the heater 16 is deenergized and the rise of the water temperature is stopped accordingly. Thereafter, the second heat exchanger 38 is controlled according to the desired temperature T2'. However, if at time t2 the heating capability of the second heat exchanger 38 is lowered due to frosting or the like and, if at time t3 the temperature T2 of the second heat exchanger 38 becomes lower than 55° C., the water temperature T3 in the forced water supply system 9 is controlled on the basis of the desired temperature (60° C.) whereby the water temperature is allowed to go up. Therefore, in the event that the heating capability of the heat pump system 14 should drop due to frosting of the first heat exchanger 34 or the like, there occurs no temperature drop with respect to the air blown from the vent register, and this makes it possible to obtain a comfortable heating condition.

If the heat pump system is used under low temperature conditions for a long period of time, frosting may occur with the heat exchanger located outside the duct to lower the heating capability of the heat pump system. In that case, it is required that a control procedure be carried out for removing the frost formed on the heat pump system. Generally, the process of such defrosting control is automatically commenced when the temperature of the first heat exchanger 34 drops below a specified temperature, whereupon the direction of refrigerant circulation in the heat pump system is reversed so that the first heat exchanger 34 is heated. Therefore, during the process of defrosting control, heating by the heat pump system 14 is not carried out and special control is required.

Figure 11:
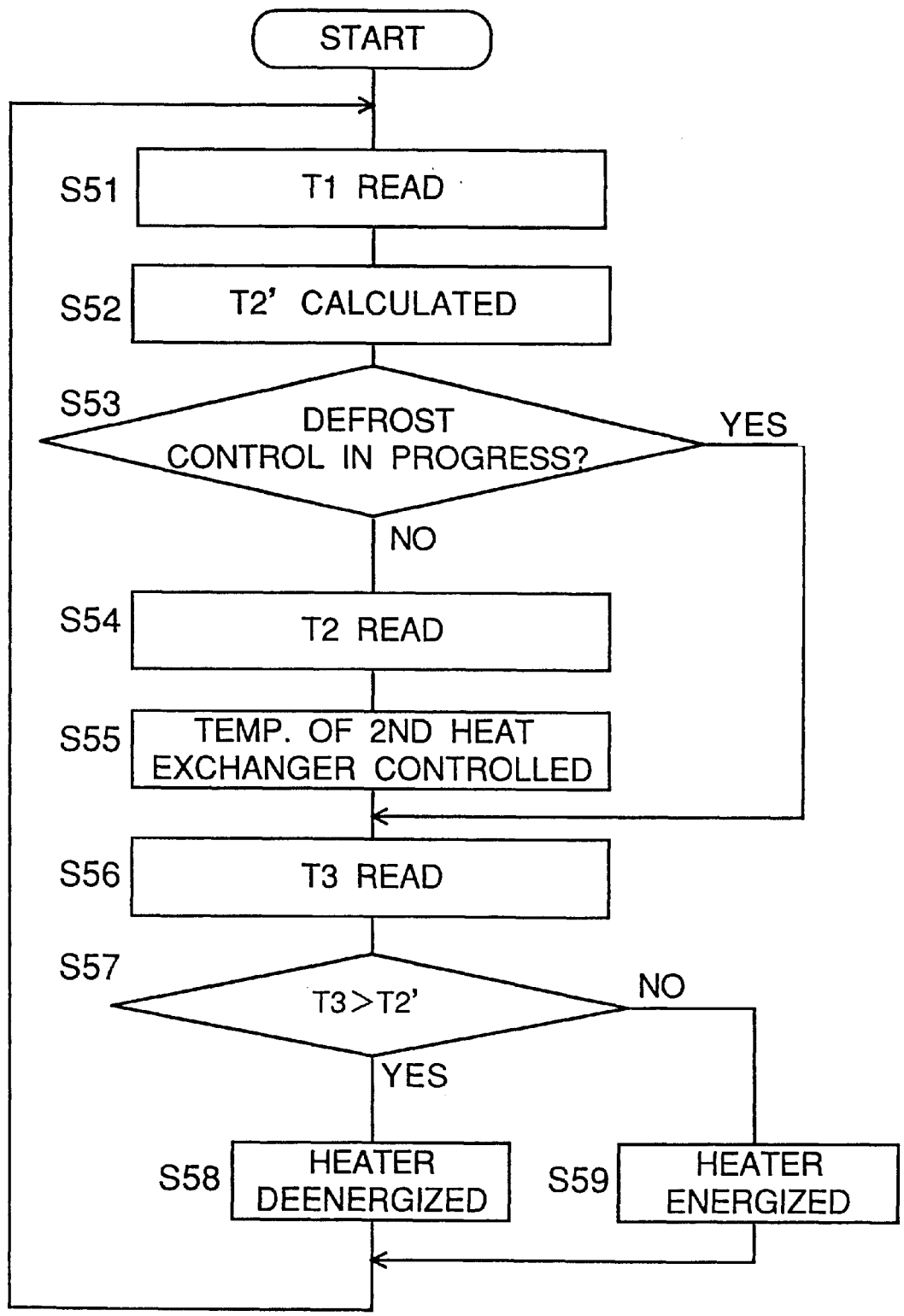
FIG. 11 is a flow chart showing a defrosting operation with respect to an air conditioning apparatus.

The process of controlling the air conditioning apparatus 13 during such defrosting operation is described hereinbelow with reference to the flow chart of FIG. 11. The process of such a control is initiated on the basis of temperature detection with respect to the first heat exchanger 34. After having been started, the air conditioning apparatus 13 reads temperature T1 preset by the heater control panel 60 (S51), and calculates a desired temperature T2' for the second heat exchanger 38 (S52). Then, a determination is made as to whether or not defrosting control is in progress (S53). If defrosting control is not in progress, from a signal output of the first temperature sensor 66 is read temperature T2 at a position downstream of the second heat exchanger 38 (position of the first temperature sensor 66) (S54). In turn, the rotation speed of a motor (not shown) annexed to the compressor 25 is controlled on the basis of the detected temperature T2 so that the temperature of the second heat exchanger 38 will agree with the desired temperature T2' (S55). If defrosting control is under way, the program jumps to step S56 without steps S54 and S55 being executed.

Subsequently, temperature T3 of the water is read from a signal from the second temperature sensor 68 (S56), and the temperature T3 is compared with the desired temperature T2' (S57). If the water temperature T3 is lower than the desired water temperature T2', the heater 24 is operated (S59), but if the water temperature T3 is higher than the desired water temperature T2', the heater 24 is deenergized (S58). Thereafter, above described steps are repeated.

Figure 12:
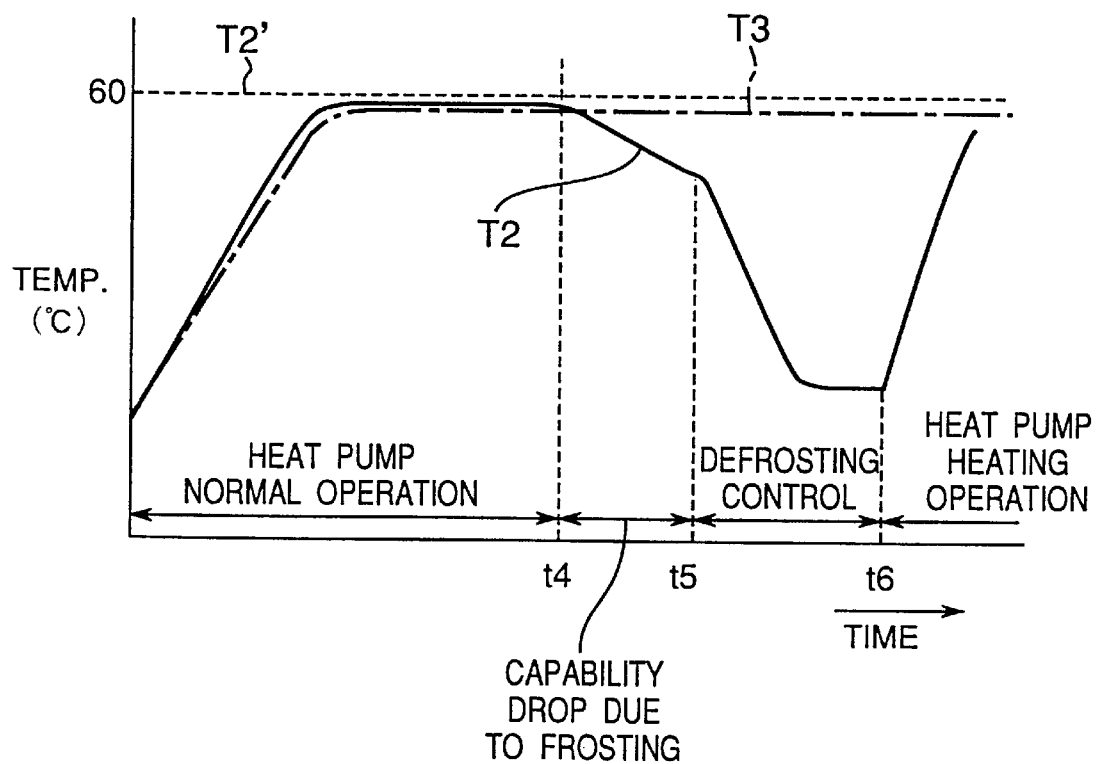
FIG. 12 is a graph showing changes with time in the temperature of the water in the heat exchanger and the temperature of the heat exchanger during a defrosting operation.

In this way, according to the present mode of control, during the process of defrosting control, the controlling of the heat pump system is not carried out, and the forced water supply system only is controlled. FIG. 12 shows changes with time in the temperature T3 of the water flowing in the heat exchanger 20 of the forced water supply system 12 and the water temperature T2 at a location downstream of the second heat exchanger 38. As the figure shows, when the drive switch 62 on the heater control panel 60 is switched on, the temperature T2 of the second heat exchanger 38 and the temperature T3 of the water in the heat exchanger 20 of the forced water supply system tend to rise with time. The heating ability begins to drop at time t4, and accordingly defrosting control is carried out for the period of from time t5 to time t6. Meanwhile, heating by the heat pump system 14 is stopped. However, the temperature T3 of the water in the heat exchanger 20 of the forced water supply system is controlled to the desired temperature T2', and this makes it possible to prevent a temperature drop with respect to the air that is blown into the vehicle interior through the vent register. During the process of defrosting in which the heat pump system 14 does not function, heating can be performed by the forced water supply system.

Figure 13:
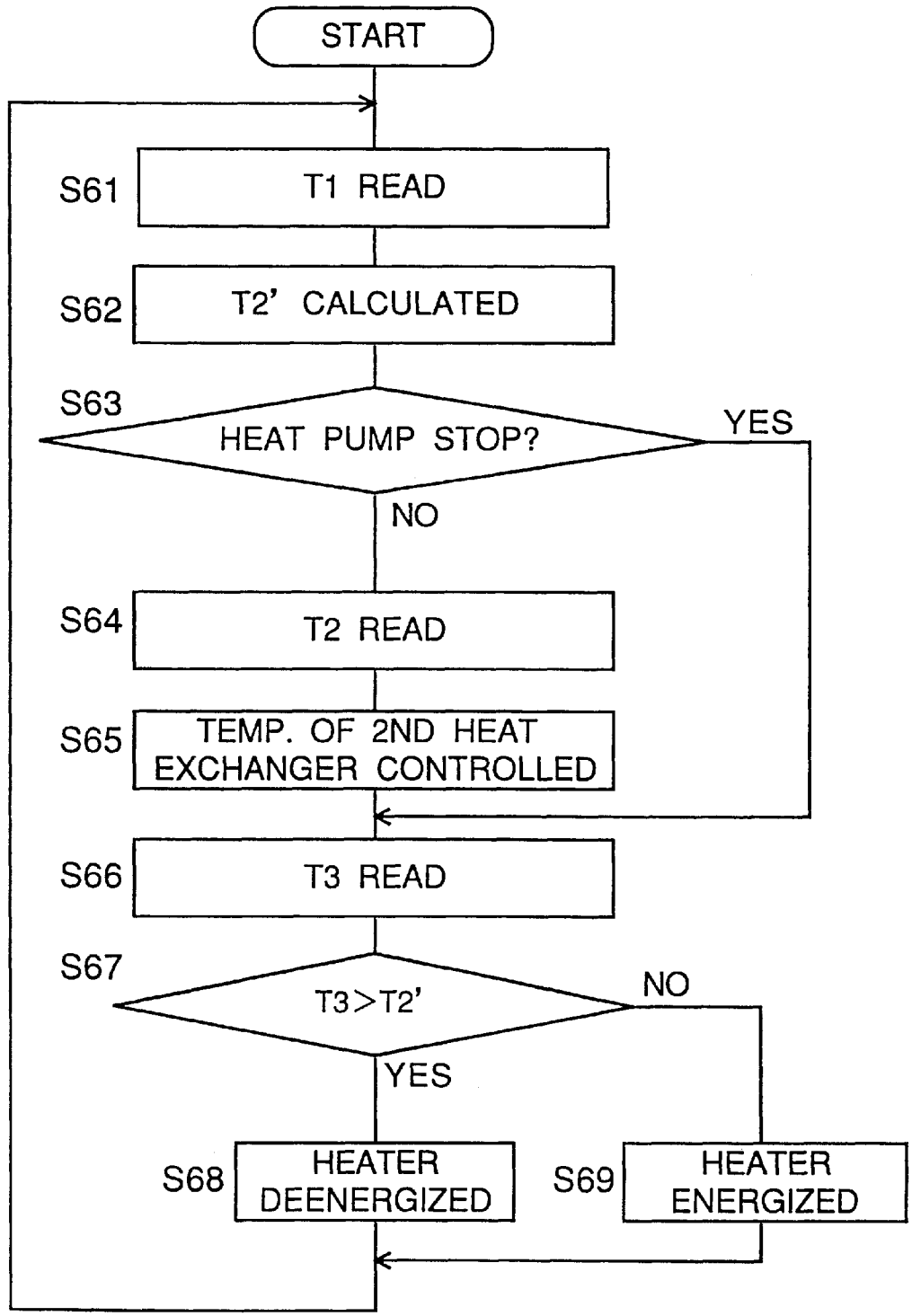
FIG. 13 is a flow chart of the process of control during a heat pump non-operation period.

In the heat pump system 14, it is arranged that even when the heat pump system 14 is in operation, operation of the compressor 25 may be stopped by a protective circuit or the like for the purpose of protecting the motor of the compressor 25 from overheating, overvoltage, or the like, the operation of the heat pump being stopped accordingly. The process of controlling the air conditioning apparatus 13 during such operation stop of the heat pump system 14 is described hereinbelow with reference to the flow chart of FIG. 13.

As earlier stated, the process of such control is started when, for example, the compressor 25 is stopped by the protective circuit for the compressor. In this process of control, when the air conditioning apparatus 13 reads preset temperature T1 from the heater control panel 60 (S61), the apparatus calculates a desired temperature T2' for the second heat exchanger 38 (S62). Then, a determination is made as to whether or not operation of the heat pump system 14 has been stopped (S63). If the heat pump system 14 has not been stopped, temperature T2 at a location downstream of the second heat exchanger 38 is read from a signal from the first temperature sensor 66 (S64). The rotation speed of the motor (not shown) of the compressor 25 is controlled on the basis of the temperature T2 so that the temperature T2 of the second heat exchanger 38 is equal to the desired temperature T2' (S65). If the heat pump system has been stopped, the program jumps to step S66 without steps S64 and S65 being executed.

Thereafter, water temperature T3 is read from a signal from the second temperature sensor 68 (S66), and a determination is made whether or not the water temperature T3 is higher than the desired temperature T2' (S67). If the water temperature T3 is lower than the desired temperature T2', the heater 24 is operated (S69), and if the water temperature T3 is higher than the desired temperature T2', the heater 24 is deenergized (S68). Thereafter, the foregoing steps are repeated.

Figure 14:
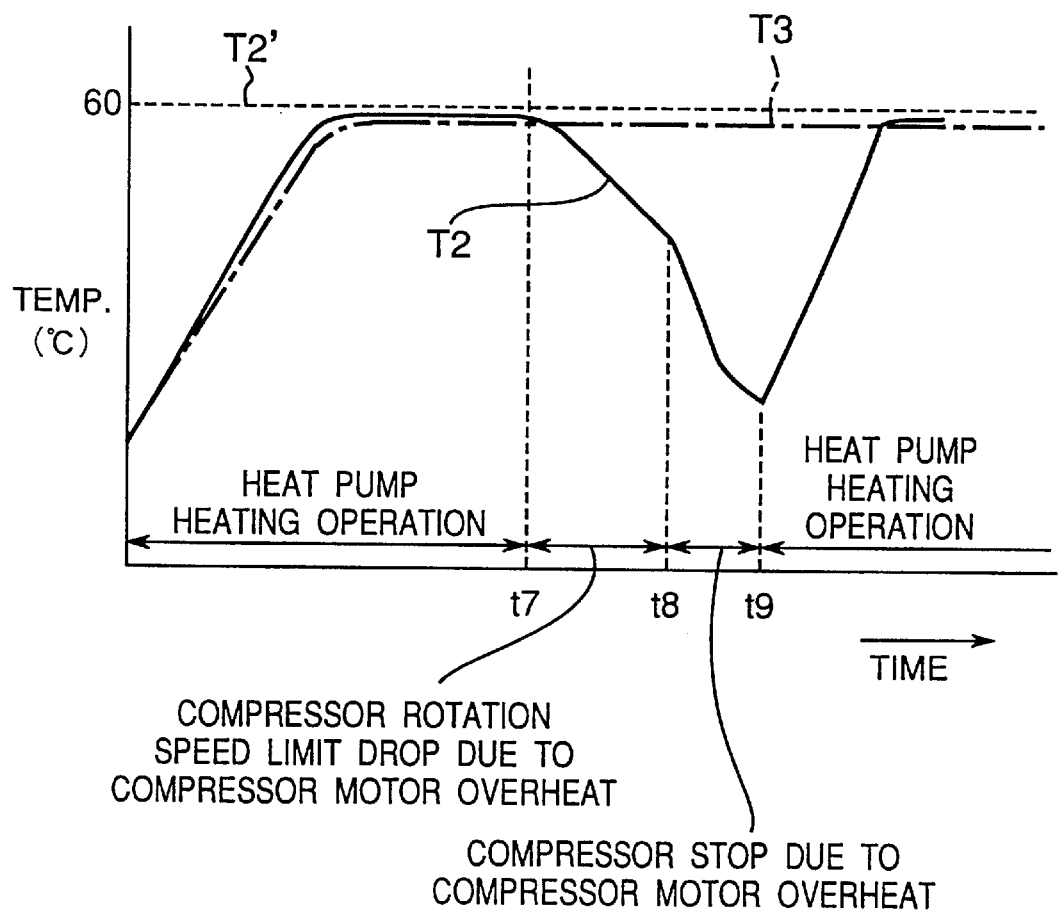
FIG. 14 is a graph showing changes with time in temperature of the heat exchanger in the process of control during the heat pump non-operation period.

In this way, according to this mode of control, while the heat pump system is in a non-operating state, the controlling of the heat pump system is not carried out, and only the forced water supply system only is controlled. FIG. 14 shows changes with time in the temperature T3 of the water in the heat exchanger 20 of the forced water supply system and the water temperature T2 of the second heat exchanger 38 as controlled according to the present mode of control. As the figure shows, when the drive switch 62 on the heater control panel 60 is switched on, the temperature T3 of the water in the second heat exchanger 38 and of the water in the heat exchanger 20 of the forced water supply system tend to rise with time. At time t7, if the rotation speed of the compressor is limited by overheating of the compressor, the temperature T2 of the second heat exchanger 38 begins to drop and, at time t8, the compressor is completely stopped. During the period of from time t8 to time t9, heating by the heat pump system 14 is stopped. However, as earlier stated, the temperature T3 of the water in the heat exchanger 20 of the forced water supply system is controlled to the desired temperature T2', and this makes it possible to prevent a temperature drop with respect to the air blown into the vehicle interior through the vent register. Even if the heat pump system 14 is stopped for the purpose of compressor protection and otherwise, heating can be performed by the forced water supply system 9.

As is apparent from the above description, the air conditioning apparatus 13 controls the desired control value for the heat exchanger 20 of the forced water supply system which is located downstream of the second heat exchanger 38 in such a way that the air heated at the second heat exchanger 38 is not deprived of heat by the heat exchanger 20 of the forced water supply system. Through this control, the quantity of heat which the air heated at the second heat exchanger 38 would lose through its contact with the heat exchanger 20 of the forced water supply system can be minimized so that wasteful power consumption at the heat exchanger 20 of the forced water supply system is restrained, whereby efficient heating is made possible. In other words, during normal heat pump operation, power consumption by the forced water supply system 9 is controlled so that power consumption at the heat pump system 14 is mainly applied for heating purposes. In the case where the quantity of air which comes in contact with the heat exchanger 20 of the forced water supply system is small, the desired control value for the heat exchanger 20 of the forced water supply system is set low so as to restrain wasteful power consumption at the heat exchanger 20 of the forced water supply system. This makes it possible to obtain efficient heating. Further, in the case where operation of the heat pump system 14 has been stopped for purposes of defrosting control and/or compressor protection, heating can be carried out by actuating the forced water supply system.

In addition, since the temperature of the water passing through the heat exchanger of the forced water supply system is controlled to a desired temperature such that the quantity of heat of which the heated air is deprived by the heat exchanger is minimized, possible heat loss of the air heated by the heat exchanger of the heat pump can be limited to a minimum. This permits prompt air heating. Further, during normal operation of the heat pump, any wasteful power consumption at the third heat exchanger is inhibited, which results in improved heating efficiency.

In the case where the quantity of air which goes in contact with the heat exchanger of the forced water supply system as controlled by the mixing valve is substantial, i.e., where the temperature of the water has considerable effect upon the temperature of the air fed into the vehicle interior, the temperature of the heat exchanger can be controlled to a temperature at which the quantity of heat exchange between the heat exchanger and the air is minimized. Through this control any wasteful power consumption at the heat exchanger is inhibited, and thus good energy saving can be achieved.

Conversely, where the quantity of air which contacts the heat exchanger of the forced water supply system is small, i.e., where the water temperature has little effect upon the temperature of the air fed into the vehicle interior, the temperature of the heat exchanger may be controlled to a temperature at which the quantity of heat exchange between the heat exchanger and the air is minimized, minus a specified temperature, or heating of the water may be stopped. Thus, where the heating effect of the heat exchanger is low, power consumption at the third heat exchanger is restrained and, therefore, good energy saving can be achieved.

Further, in the case where the temperature of the heat exchanger is lower than the desired temperature by more than the specified degree, the temperature of the water passing through the heat exchanger of the forced water supply system may be controlled to a temperature at which the quantity of heat exchange between the air and the third heat exchanger is minimized. By so doing it is possible to properly control the forced water supply system even when the ability of heating means of the heat pump has dropped or operation of such means has been stopped due to defrosting control or the like, it being thus possible to prevent any temperature drop with respect to the air blown into the vehicle interior.

Further, during a defrosting operation for removing the frost deposited on the first heat exchanger of the heat pump system, or when operation of the heat exchanger of the system is stopped for the purpose of protecting the heat pump system, the temperature of the water flowing in the heat exchanger of the forced water supply system may be controlled to a temperature at which the quantity of heat exchange between the air and the third heat exchanger can be minimized. In this case, even if the ability of the heat pump has dropped or operation of the heat pump has been stopped, the forced water supply system is properly controlled so that any temperature drop can be reasonably prevented with respect to the air blown into the vehicle interior, there being no possibility of causing any uncomfortable feel to a person or persons in the vehicle.

The temperature at which the quantity of heat exchange between the air heated by the heat exchanger of the heat pump to the desired temperature and the heat exchanger of the forced water supply system is minimized may be set to the desired temperature, or the desired temperature plus a specified degree of temperature. In this case, the loss of heat at the heat exchanger of the forced water supply system is minimized.

While the invention has been described with reference to preferred embodiments thereof, it will be understood by those skilled in the art that various modifications and variations are possible in the light of the above teachings. Therefore, the present invention is not limited to the particulars disclosed in the detailed description thereof, but the scope of the invention is to be determined solely by the appended claims.

The teachings given herein relates to the particulars included in Japanese Patent Application (No. 8-261646) filed on Oct. 9, 1996 which are incorporated herein by reference.

What is claimed is:

1. An automotive air conditioning apparatus comprising:
   (a) a duct for supplying air into a vehicle interior, said duct having a first end connected to a vehicle interior and a second end in communication with atmospheric air;
   (b) a heat pump system including:
      a circulating pipe for circulating a refrigerant,
      a first heat exchanger communicating with said circulating pipe for causing the refrigerant to absorb heat from outside air, and
      a second heat exchanger communicating with said circulating pipe and disposed within said duct for heating air in said duct by radiating the heat absorbed by the refrigerant in said first heat exchanger;
   (c) a forced water supply system including:
      a circulating pipe for circulating water, and
      a third heat exchanger disposed in said duct at a location downstream of said second heat exchanger in relation to the direction of air flow through said duct, said third heat exchanger being operative to further heat the air in said duct;
   (d) setting means for presetting a temperature of the air supplied into the vehicle interior through said duct; and
   (e) a controller for controlling the temperature of said second heat exchanger to a desired temperature calculated on the basis of the temperature preset by said setting means, and for controlling the temperature of the water flowing in said third heat exchanger to a temperature at which the quantity of heat exchange between the air from said second heat exchanger and said third heat exchanger is minimized.

2. An air condition apparatus as claimed in claim 1, further comprising:
   a partition wall extending longitudinally within said duct and defining a first passageway and a second passageway, wherein said third heat exchanger is located in the first passageway, and the second passageway is disposed opposite relative to said third heat exchanger so that air flowing through the second passageway bypasses said third heat exchanger; and
   a valve disposed upstream of said partition wall for adjusting the quantity of air flow through the first and second passageways on the basis of the preset temperature,
   wherein said controller is operative to control the temperature of the second heat exchanger to the desired temperature as calculated on the basis of the preset temperature where the ratio of the quantity of air passing the first passageway to the quantity of air flowing in said duct is more than a specified ratio, and to control the temperature of the water flowing in said third heat exchanger to the temperature at which the quantity of heat exchange between the air from the second heat exchanger and the third heat exchanger is minimized.

3. An air conditioning apparatus as claimed in claim 2, wherein:

the temperature of the second heat exchanger is controlled to the desired temperature as calculated on the basis of the preset temperature in the case where the ratio of the quantity of air passing the first passageway to the quantity of air flowing in the duct is more than a specified ratio, and the temperature of the water flowing in said third heat exchanger is controlled to a temperature which is lower by a specified degree than the temperature at which the quantity of heat exchange between the air from said second heat exchanger and said third heat exchanger is minimized, or the water is not heated.

4. An air conditioning apparatus as claimed in claim 1, wherein:

the temperature of the water flowing in said third heat exchanger is controlled to a temperature at which the quantity of heat exchange between the air from said second heat exchanger and said third heat exchanger is minimized, if the temperature of said second heat exchanger is lower than the desired temperature by more than a specified temperature.

5. An air conditioning apparatus as claimed in claim 2, wherein:

the temperature of the water flowing in said third heat exchanger is controlled to a temperature at which the quantity of heat exchange between the air from said second heat exchanger and said third heat exchanger is minimized, if the temperature of said second heat exchanger is lower than the desired temperature by more than a specified temperature.

6. An air conditioning apparatus as claimed in claim 3, wherein:

the temperature of the water flowing in said third heat exchanger is controlled to a temperature at which the quantity of heat exchange between the air from said second heat exchanger and said third heat exchanger is minimized, if the temperature of said second heat exchanger is lower than the desired temperature by more than a specified temperature.

7. An air conditioning apparatus as claimed in claim 1, wherein during a defrosting operation for removing frost deposited on said first heat exchanger, the temperature of the water flowing in said third heat exchanger is controlled to the temperature at which the quantity of heat exchange between the air from said second heat exchanger and said third heat exchanger is minimized.

8. An air conditioning apparatus as claimed in claim 2, wherein during a defrosting operation for removing frost deposited on said first heat exchanger, the temperature of the water flowing in said third heat exchanger is controlled to the temperature at which the quantity of heat exchange between the air from said second heat exchanger and said third heat exchanger is minimized.

9. An air conditioning apparatus as claimed in claim 3, wherein during a defrosting operation for removing frost deposited on said first heat exchanger, the temperature of the water flowing in said third heat exchanger is controlled to the temperature at which the quantity of heat exchange between the air from said second heat exchanger and said third heat exchanger is minimized.

10. An air conditioning apparatus as claimed in claim 1, wherein, while said second heat exchanger is in a non-operating state in order to protect said heat pump system, the temperature of the water flowing in said third heat exchanger is controlled to the temperature at which the quantity of heat exchange between the air from said second heat exchanger and said third heat exchanger is minimized.

11. An air conditioning apparatus as claimed in claim 2, wherein, while said second heat exchanger is in a non-operating state in order to protect said heat pump system, the temperature of the water flowing in said third heat exchanger is controlled to the temperature at which the quantity of heat exchange between the air from said second heat exchanger and said third heat exchanger is minimized.

12. An air conditioning apparatus as claimed in claim 3, wherein, while said second heat exchanger is in a non-operating state in order to protect said heat pump system, the temperature of the water flowing in said third heat exchanger is controlled to the temperature at which the quantity of heat exchange between the air from said second heat exchanger and said third heat exchanger is minimized.

13. An air conditioning apparatus as claimed in claim 1, wherein the temperature at which heat exchange is minimized is the desired temperature, or the desired temperature plus a specified temperature value.

14. An air conditioning apparatus as claimed in claim 2, wherein the temperature at which heat exchange is minimized is the desired temperature, or the desired temperature plus a specified temperature value.

15. An air conditioning apparatus as claimed in claim 3, wherein the temperature at which heat exchange is minimized is the desired temperature, or the desired temperature plus a specified temperature value.

16. An air conditioning apparatus as claimed in claim 1, further comprising a temperature sensor disposed in said duct downstream of said second heat exchanger.

17. An air conditioning apparatus as claimed in claim 2, further comprising a temperature sensor disposed in said duct downstream of said second heat exchanger.

18. An air conditioning apparatus as claimed in claim 3, further comprising a temperature sensor disposed in said duct downstream of said second heat exchanger.

* * * * *